United States Patent
Takahara et al.

(10) Patent No.: US 8,303,846 B2
(45) Date of Patent: Nov. 6, 2012

(54) INFRA-RED LIGHT EMITTING PHOSPHOR

(75) Inventors: Takeshi Takahara, Tokyo (JP); Yasushi Aoki, Tokyo (JP); Kaori Kanesaka, Tokyo (JP); Takashi Murase, Tokyo (JP)

(73) Assignee: Nemoto & Co., Ltd., Tokyo (JP)

( * ) Notice: Subject to any disclaimer, the term of this patent is extended or adjusted under 35 U.S.C. 154(b) by 805 days.

(21) Appl. No.: 11/817,967

(22) PCT Filed: Mar. 27, 2006

(86) PCT No.: PCT/JP2006/306107
§ 371 (c)(1),
(2), (4) Date: Sep. 7, 2007

(87) PCT Pub. No.: WO2006/104081
PCT Pub. Date: Oct. 5, 2006

(65) Prior Publication Data
US 2009/0267027 A1    Oct. 29, 2009

(30) Foreign Application Priority Data
Mar. 29, 2005  (JP) .................. 2005-094972

(51) Int. Cl.
C09K 11/02  (2006.01)
C09K 11/08  (2006.01)
C09K 11/77  (2006.01)

(52) U.S. Cl. ............................................. 252/301.4 R (58) Field of Classification Search .......... 252/301.4 R
See application file for complete search history.

(56) References Cited

U.S. PATENT DOCUMENTS
7,399,428 B2 * 7/2008 Li et al. .................. 252/301.4 R
2007/0096057 A1 * 5/2007 Hampden-Smith et al. ........................ 252/301.16

FOREIGN PATENT DOCUMENTS
| FR | 1 520 520 A | 12/1968 |
| GB | 2013233 A | 8/1979 |
| JP | 54-033634 | 3/1979 |
| JP | 54-100991 | 8/1979 |
| JP | 03-288984 | 12/1991 |
| JP | 07-090266 | 4/1995 |
| JP | 2006-028480 | 2/2006 |
| WO | WO 81/03510 A | 12/1981 |

OTHER PUBLICATIONS

Zhuang. Growth and spectroscopic investigation of Nd,Yb:GdVO4 single crystal Journal of Crystal Growth. vol. 271. Issues 1-2. Oct. 2004. pp. 151-158.*
Kisel. Spectroscopy and continuous-wave diode-pumped laser action of Yb3+:YVO4. Optics Letters, vol. 29, No. 21, 2004.*

* cited by examiner

Primary Examiner — Carol M Koslow
Assistant Examiner — Matthew Hoban
(74) Attorney, Agent, or Firm — Allen, Dyer, Doppelt, Milbrath & Gilchrist, P.A.

(57) ABSTRACT

It is an object of the present invention to provide an infra-red light emitting phosphor having an excellent chemical stability and desirable light emitting properties. The infra-red light emitting phosphor is represented by a chemical formula: $(A_{1-x-y}Nd_xYb_y)VO_4$, wherein A represents at least one element selected from yttrium (Y), gadolinium (Gd), lutetium (Lu) and lanthanum (La); x and y respectively satisfy the requirements: $0.01 \leq x \leq 0.3$ and $0.01 \leq y \leq 0.4$, provided that $(x+y) \leq 0.5$ and $0.2 \leq (y/x) \leq 6$. This vanadate phosphor having the constitution described above can act as an infra-red light emitting phosphor having an excellent chemical stability and desirable light emitting properties.

2 Claims, 4 Drawing Sheets

INFRA-RED LIGHT EMITTING PHOSPHOR

RELATED APPLICATIONS

This application is a 35 USC 371 national stage application, which claims priority from International Application No. PCT/JP2006/306107 filed Mar. 27, 2006, which in turn claims priority from Japanese Patent application No. 2005-094972 filed Mar. 29, 2005.

TECHNICAL FIELD

The present invention relates to an infra-red light emitting phosphor emitting light in an infra-red range.

BACKGROUND ART

In recent years, there have been known methods for judging whether credit cards and brand goods or the like are forged, for preventing the forgery of credit cards or the like and preventing the forgery of brand goods. As one type of method, for example, there has been known an optical reading device. In the optical reading device, marks or the like are printed using a phosphor-containing ink unobservable to the naked eye to form a latent image mark. The latent image mark is irradiated with visible light or infra-red light to excite the phosphor. The infra-red light emitted from the phosphor and hardly observed by the naked eye are received, and the latent image mark is detected.

Since the latent image mark for judging what is real and what is false is not easily visible to the naked eye according to this method, a forger rarely prints this latent image mark, and cards and articles forged or altered can be reliably detected. Also, since only a genuine card manufacturer and an article manufacturer know the contents of the latent image mark, it is very difficult to forge or alter the card or the like.

As such a phosphor, there have been known many phosphors which contain neodymium (Nd) and ytterbium (Yb), for example, $Ca_{10}(PO_4)_6F_2$:Nd,Yb, $Ca_8La_2(PO_4)_6O_2$:Nd,Yb, $YAlO_3$:Nd,Yb, $Y_3Al_5O_{12}$:Nd,Yb, $(Y,La,Lu)PO_4$:Nd,Yb, $(Nd,Yb)P_3O_9$, $(Nd,Yb)P_5O_{14}$, $(Li,Na,K)(Nd,Yb)P_4O_{12}$, $K_3(Nd,Yb)P_2O_8$, $Na(Nd,Yb)(WO_4)_2$, $Na_5(Nd,Yb)(WO_4)_4$, $Na(Nd,Yb)(MoO_4)_2$, $Na_5(Nd,Yb)(MoO_4)_4$, $Na_2(Nd,Yb)Mg_2(VO_4)_3$, $(Al,Cr)_3(Nd,Yb)(BO_3)_4$, $Na_5(Nd,Yb)((Si,Ge)O_3)_4$, $Na_3(Nd,Yb)(Si,Ge)_2O_7$, $(Nd,Yb)MgAl_{11}O_{19}$ and a material prepared by replacing a part of neodymium (Nd) and ytterbium (Yb) having the above composition with at least one element selected from, for example, Y, Sc, La, Ce, Gd, Lu, Ga, In, Sb and Bi as the element which can take trivalence and has no absorption in a wavelength range of 800 nm to 1000 nm (for example, see Patent Documents 1 to 4).

Of these phosphors, for example, an $Na_5(Nd,Yb)(MoO_4)_4$ phosphor has often been used for preventing forgery in view of emission intensity, sensitivity and conformity with a photoreceiver.

Patent Document 1: Japanese Laid-Open Patent Publication No. 54-33634 (pages 2, 3)
Patent Document 2: Japanese Laid-Open Patent Publication No. 54-100991 (pages 1-3)
Patent Document 3: Japanese Laid-Open Patent Publication No. 3-288984 (page 2)
Patent Document 4: Japanese Patent No. 3438188 (pages 1, 2)

DISCLOSURE OF THE INVENTION

Problems to be Solved by the Invention

However, since a part of the composition elements of the host of the above phosphor are alkaline metals, the phosphor is easily dissolved in moisture, and in particular, this tendency becomes strong in an acidic atmosphere. Therefore, the phosphor is chemically unstable in response to humidity and, in particular, an acidic atmosphere, and the emission intensity may be significantly reduced.

Also, the phosphor has a problem that further enhancement in the emission intensity is required so that a small amount of phosphor can be detected in order that the phosphor itself is further hardly seen by the naked eye.

The present invention has been made in view of such problems, and it is an object of the present invention to provide an infra-red light emitting phosphor having chemical stability and high emission intensity.

Means for Solving the Problems

An infra-red light emitting phosphor represented by a chemical formula: $(A_{1-x-y}Nd_xYb_y)VO_4$, wherein A represents at least one element selected from yttrium (Y), gadolinium (Gd), lutetium (Lu) and lanthanum (La); x and y respectively satisfy the requirements: $0.01 \leq x \leq 0.3$ and $0.01 \leq y \leq 0.4$, provided that $(x+y) \leq 0.5$ and $0.2 \leq (y/x) \leq 6$.

An infra-red light emitting phosphor having chemical stability and high emission intensity is produced by setting the amount x of neodymium (Nd), and the amount y of ytterbium (Yb) to the above range in the above chemical formula.

Herein, the amount x of the neodymium (Nd) exceeding 0.3 causes a reduction in the emission intensity due to concentration quenching. Since the amount x of less than 0.01 causes insufficient concentration of the neodymium as an activator, all in all, the emission intensity is reduced.

Also, similarly, the amount y of ytterbium (Yb) exceeding 0.4 causes a reduction in the emission intensity due to concentration quenching. Since the amount y of less than 0.01 similarly causes insufficient concentration of the ytterbium as an activator, all in all, the emission intensity is reduced.

Furthermore, when x+y representing the total amount of neodymium and ytterbium exceeds 0.5, the concentration of an activator to a host is excessively increased, and thereby the emission intensity is reduced.

Furthermore, when y/x representing the molar ratio of ytterbium to neodymium is less than 0.2, the amount of the ytterbium bearing a role for converting internal energy into emission is made deficient as compared to the amount of the neodymium mainly bearing a role for absorbing light energy from the outside. Therefore, since it is considered that the efficiency for transmitting the energy absorbed by the neodymium to the ytterbium is reduced, the emission intensity is reduced.

By contrast, when y/x exceeds 6, the amount of the neodymium is made deficient as compared to that of the ytterbium, and thereby it is considered that the amount of absorbable energy is made deficient. All in all, the emission intensity is reduced.

As described above, the amount x of the neodymium is set to $0.01 \leq x \leq 0.3$; the amount y of the ytterbium is set to $0.01 \leq y \leq 0.4$; x+y representing the total amount of the neodymium and ytterbium is set to 0.5 or less; and y/x representing the molar ratio of the ytterbium to the neodymium is set to $0.2 \leq (y/x) \leq 6$, and thereby an infra-red light emitting phosphor with high emission intensity can be obtained.

According to another embodiment, there is provided an infra-red light emitting phosphor as set forth above, wherein x and y respectively satisfy the requirements: $x \leq 0.2$ and $y \leq 0.15$, provided that $(x+y) \leq 0.3$ and $0.5 \leq (y/x) \leq 2.5$.

The infra-red light emitting phosphor having higher emission intensity is produced by setting the amount x of the neodymium (Nd), and the amount y of the ytterbium (Yb) to the above range in the above chemical formula.

Effects of the Invention

According to the infra-red light emitting phosphor, the infra-red light emitting phosphor is represented by the chemical formula: $(A_{1-x-y}Nd_xYb_y)VO_4$, wherein A represents at least one element selected from yttrium (Y), gadolinium (Gd), lutetium (Lu) and lanthanum (La); x and Y respectively satisfy the requirements: $0.01 \leq x \leq 0.3$ and $0.01 \leq y \leq 0.4$, provided that $(x+y) \leq 0.5$ and $0.2 \leq (y/x) \leq 6$. Accordingly, there can be obtained the infra-red light emitting phosphor having chemical stability and high emission intensity.

According to the infra-red light emitting phosphor of another embodiment, x and Y respectively satisfy the requirements: $x \leq 0.2$ and $y \leq 0.15$, provided that $(x+y) \leq 0.3$ and $0.5 \leq (y/x) \leq 2.5$. Accordingly, there can be obtained the infra-red light emitting phosphor having higher emission intensity in addition to the effects of the infra-red light emitting phosphor of the first embodiment described above.

BEST MODE FOR CARRYING OUT OF THE INVENTION

Hereinafter, a process of manufacturing an infra-red light emitting phosphor in an embodiment of the present invention will be described.

First, for example, neodymium oxide ($Nd_2O_3$) serving as a material of neodymium (Nd), for example, ytterbium oxide ($Yb_2O_3$) serving as a material of ytterbium (Yb), and, for example, yttrium oxide ($Y_2O_3$) serving as a material of yttrium (Y) which is an example of rare earth elements represented by A are used for producing a mixed powder of oxide. Although the oxides may be merely mixed at this time, it is more preferable to take the form of a coprecipitated oxide instead of the mere mixing.

That is, for example, the above neodymium oxide, ytterbium oxide and yttrium oxide or the like are dissolved in nitric acid or the like to produce an aqueous solution. Then, each oxalic acid salt coprecipitation is obtained by adding an oxalic acid aqueous solution to this solution, and this oxalic acid salt coprecipitation is fired in air at, for example, 800° C. to 1000° C. for approximately 1 hour to approximately 5 hours to obtain a coprecipitated oxide. Neodymium and ytterbium as the activator are uniformly dispersed in the yttrium oxide as the rare earth oxide in the thus obtained coprecipitated oxide and they are mixed. Therefore, since the activator is uniformly dispersed in the phosphor obtained using this coprecipitated oxide as the material, a phosphor having higher luminosity can be obtained.

Although each oxide is used as a starting material at this time, other salt or the like may be used as long as the material can obtain each aqueous solution and can precipitate the oxalic acid salt using the oxalic acid aqueous solution.

The method for obtaining the above coprecipitated oxide is not limited to the method for thermally decomposing the above oxalic acid salt coprecipitation. Examples thereof include a urea uniform precipitating method, a metal alkoxide method and a hydrothermal synthesis method.

Next, for example, sodium stearate ($C_{17}H_{35}COONa$) which is an organic alkali metal compound as flux is added to the obtained coprecipitated oxide. Furthermore, these are sufficiently mixed in, for example, an alumina mortar using, for example, ethanol as a solvent and dried. After drying, furthermore, for example, vanadium pentoxide ($V_2O_5$) serving as a material of vanadium (V) is added to the resultant mixture, and is sufficiently mixed. The thus obtained mixed powder is fired in the temperature range of 800° C. to 1300° C., preferably 900° C. to 1200° C. for approximately 0.1 hours to approximately 72 hours, preferably for approximately 1 hour to approximately 12 hours. After this firing, a phosphor having a predetermined particle size is obtained by a grinding process, a washing process, a drying process and a sieve process.

Examples of the materials of vanadium include meta-ammonium vanadate and ortho-ammonium vanadate other than vanadium pentoxide. However, in view of being mass-produced as industrial products, vanadium pentoxide is preferable.

Also, it is preferable that referring to the ratio of the fed amount of each element constituting the phosphor, the composition has slightly more vanadium than the composition set to $(A+Nd+Yb):V=1:1$ when each element is represented by the stoichiometry composition represented by $(A_{1-x-y}Nd_xYb_y)VO_4$, that is, the molar ratio. Specifically, $V/(A+Nd+Yb)$ is preferably to 1.2, in other words, in the range of the fed amount of $1.0 \leq V/(A+Nd+Yb) \leq 1.2$.

On the other hand, the flux is not particularly limited as long as the flux has an effect for promoting crystal growth. However, preferable is at least one of an organic alkali metal compound and vanadium alkali compound which have excellent uniform mixing property with the other phosphor material, act effectively as flux in heating and have an effect for developing crystal having little crystal defect.

Any compound can be used as the organic alkali metal compound as long as the alkaline metal oxide is formed in heating in the atmosphere. However, sodium stearate and potassium stearate are preferable in particular since these can be uniformly mixed with the other phosphor material in particular.

Sodium ortho-vanadate ($Na_3VO_4$) and sodium meta-vanadate ($NaVO_3$) for particularly promoting the crystal growth as the vanadium alkali metal compound are preferable.

It is preferable to use one or more compounds selected from the above compounds as the flux in order to obtain the effects of the above flux. However, the compound containing potassium is preferably used as the flux for obtaining the phosphor having substantially the same particle diameter as that of the coprecipitated oxide in the manufacturing process. Of these, at least either potassium carbonate or potassium stearate is preferable.

The amount of the flux is preferably 0.01 mol % to 40 mol % as the alkaline metal relative to 1 mol of the phosphor as the object. When the amount of the flux is small, high luminosity is hardly obtained. When the amount of the flux is large, the luminosity tends to be reduced. The range of the desirable amount of the flux is 0.5 mol % to 20 mol %, and more preferably 1 mol % to 10 mol %. The high luminosity can be obtained even if two or more kinds of fluxes are used together.

Also, since a vanadium compound exists as a sub-product in the fired object after the firing process when the phosphor is obtained by the above methods, this unnecessary vanadium compound is removed by a washing process and a cleaning process by an alkaline aqueous solution.

This phosphor is a vanadate infra-red light emitting phosphor which absorbs light in the wavelength range of visible light or infra-red light, and emits light in the infra-red range. Furthermore, in this phosphor, light is emitted by the forbidden transition of the 4 f electron of Nd and Yb. The reason why the emission intensity is high regardless of the small particle is assumed that the crystallinity of the vanadic acid salt as a host is favorable and Nd and Yb of large amounts can be contained. Also, it is considered that the crystallinity is further enhanced by adding an alkaline metal or alkaline earth metal of small amounts as the flux and the emission intensity is enhanced.

Next, some infra-red light emitting phosphors of the present invention are shown as Examples of the above embodiment, and simultaneously, these characteristics will be described as compared to the characteristics of the conventional infra-red light emitting phosphor.

EXAMPLE 1

First, a phosphor is produced using yttrium (Y) as a rare earth element represented by A.

18.1 g (0.16 mols of Y element) of yttrium oxide ($Y_2O_3$) serving as a material of yttrium (Y), 3.37 g (0.02 mols of Nd element) of neodymium oxide ($Nd_2O_3$) serving as a material of neodymium (Nd), and 3.94 g (0.02 mols of Yb element) of ytterbium oxide ($Yb_2O_3$) serving as a material of ytterbium (Yb) are heated and dissolved in nitric acid to provide an aqueous solution. Then, an oxalic acid aqueous solution is added to this aqueous solution to precipitate an oxalic acid coprecipitate. This oxalic acid coprecipitation is fired in air at approximately 900° C. for approximately 3 hours to convert the same into a coprecipitated oxide. 1.53 g (0.005 mols of Na, and 2.5 mol % based on Y+Yb+Nd) of sodium stearate ($C_{17}H_{35}COONa$) as flux is sufficiently added with the thus obtained coprecipitated oxide in an alumina mortar using ethanol as a solvent, and dried. After drying, 20.0 g (0.22 mols of V element and 1.1 times based on Y+Yb+Nd) of vanadium pentoxide ($V_2O_5$) serving as a material of vanadium (V) is further added, and sufficiently mixed to provide a mixed powder. The obtained mixed powder is fired at approximately 1150° C. for approximately 4 hours. The mixed powder is taken out from an electric furnace immediately after firing, and cooled in air.

Then, boiling water of 80° C. to 100° C. is put into a crucible. The phosphor is then taken out from the crucible and boiled. After boiling, a bead mill is performed for approximately 3 hours. The phosphor is cleaned in a 10% sodium hydroxide aqueous solution, washed and dried to obtain the phosphor as the object. This is provided as Sample 1-(1). The composition of this Sample 1-(1) is $(Y_{0.8}Nd_{0.1}Yb_{0.1})VO_4$.

Next, a phosphor is produced using yttrium (Y) and gadolinium (Gd) as a rare earth element represented by A.

15.8 g (0.14 mols of Y element) of yttrium oxide ($Y_2O_3$) serving as a material of yttrium (Y), 3.62 g (0.02 mols of Gd element) of gadolinium oxide ($Gd_2O_3$) serving as a material of gadolinium (Gd), 3.37 g (0.02 mols of Nd element) of neodymium oxide ($Nd_2O_3$) serving as a material of neodymium (Nd), and 3.94 g (0.02 mols of Yb element) of ytterbium oxide ($Yb_2O_3$) serving as a material of ytterbium (Yb) are heated and dissolved in nitric acid to produce an aqueous solution. Then, an oxalic acid aqueous solution is added to this aqueous solution to precipitate an oxalic acid coprecipitate. This oxalic acid coprecipitate is fired in air at approximately 900° C. for approximately 3 hours to convert the same into a coprecipitated oxide. 1.61 g (0.005 mols of K, 2.5 mol % based on Y+Gd+Yb+Nd) of potassium stearate ($C_{17}H_{35}COOK$) as flux is sufficiently added with the thus obtained coprecipitated oxide in an alumina mortar using ethanol as a solvent, and dried. After drying, 25.7 g mols of V element and 1.1 times based on Y+Gd+Yb+Nd) of ammonium vanadate ($NH_4VO_3$) serving as a material of vanadium (V) is further added, and sufficiently mixed to provide a mixed powder. The obtained mixed powder is fired at approximately 1150° C. for approximately 4 hours. The mixed powder is taken out from an electric furnace immediately after firing, and cooled in air.

Then, boiling water of 80° C. to 100° C. is put into a crucible. The phosphor is then taken out from the crucible and boiled. After boiling, a bead mill is performed for approximately 3 hours. The phosphor is cleaned in a 10% sodium hydroxide aqueous solution, washed and dried to obtain the phosphor as the object. This is provided as Sample 1-(2). The composition of this Sample 1-(2) is $(Y_{0.7}Gd_{0.1}Nd_{0.1}Yb_{0.1})VO_4$.

Next, a phosphor is produced using yttrium (Y) and lutetium (Lu) as a rare earth element represented by A.

15.8 g (0.14 mols of Y element) of yttrium oxide ($Y_2O_3$) serving as a material of yttrium (Y), 3.94 g (0.02 mols of Lu element) of lutetium oxide ($Lu_2O_3$) serving as a material of lutetium (Lu), 3.37 g (0.02 mols of Nd element) of neodymium oxide ($Nd_2O_3$) serving as a material of neodymium (Nd), and 3.94 g (0.02 mols of Yb element) of ytterbium oxide ($Yb_2O_3$) serving as a material of ytterbium (Yb) are heated and dissolved in nitric acid to produce an aqueous solution. Then, an oxalic acid aqueous solution is added to this aqueous solution to precipitate an oxalic acid coprecipitate. This oxalic acid coprecipitate is fired in air at approximately 900° C. for approximately 3 hours to convert the same into a coprecipitated oxide. 1.53 g (0.005 mols of Na, 2.5 mol % based on Y+Lu+Yb+Nd) of sodium stearate ($C_{17}H_{35}COONa$) as flux is sufficiently added with the thus obtained coprecipitated oxide in an alumina mortar using ethanol as a solvent, and dried. After drying, 20.0 g (0.22 mols of V element and 1.1 times based on Y+Lu+Yb+Nd) of vanadium pentoxide ($V_2O_5$) serving as a material of vanadium (V) is further added, and sufficiently mixed to provide a mixed powder. The obtained mixed powder is fired at approximately 1150° C. for approximately 4 hours. The mixed powder is taken out from an electric furnace immediately after firing, and cooled in air.

Then, boiling water of 80° C. to 100° C. is put into a crucible. The phosphor is then taken out from the crucible and boiled. After boiling, a bead mill is performed for approximately 3 hours. The phosphor is cleaned in a 10 sodium hydroxide aqueous solution, washed and dried to obtain the phosphor as the object. This is provided as Sample 1-(3). The composition of this Sample 1-(3) is $(Y_{0.7}Lu_{0.1}Nd_{0.1}Yb_{0.1})VO_4$.

Next, a phosphor is produced using yttrium (Y), lanthanum (La) and gadolinium (Gd) as a rare earth element represented by A.

15.8 g (0.14 mols of Y element) of yttrium oxide ($Y_2O_3$) serving as a material of yttrium (Y), 1.63 g (0.01 mols of La element) of lanthanum oxide ($La_2O_3$) serving as a material of lanthanum (La), 1.81 g (0.01 mols of Gd element) of gadolinium oxide ($Gd_2O_3$) serving as a material of gadolinium (Gd), 3.37 g (0.02 mols of Nd element) of neodymium oxide ($Nd_2O_3$) serving as a material of neodymium (Nd), and 3.94 g (0.02 mols of Yb element) of ytterbium oxide ($Yb_2O_3$) serving as a material of ytterbium (Yb) are heated and dissolved in nitric acid to produce an aqueous solution. Then, an oxalic acid aqueous solution is added to this aqueous solution to precipitate an oxalic acid coprecipitate. This oxalic acid coprecipitate is fired in air at approximately 900° C. for approximately 3 hours to convert the same into a coprecipitated oxide. 1.53 g (0.005 mols of Na, 2.5 mol % based on Y+La+Gd+Yb+Nd) of sodium stearate ($C_{17}H_{35}COONa$) as flux is sufficiently added with the thus obtained coprecipitated oxide in an alumina mortar using ethanol as a solvent, and dried. After drying, 20.0 g (0.22 mols of V element and 1.1 times based on Y+La+Gd+Yb+Nd) of vanadium pentoxide ($V_2O_5$) serving as a material of vanadium (V) is further added, and sufficiently mixed to provide a mixed powder. The obtained mixed powder is fired at approximately 1150° C. for approximately 4 hours. The mixed powder is taken out from an electric furnace immediately after firing, and cooled in air.

Then, boiling water of 80° C. and 100° C. is put into a crucible. The phosphor is then taken out from the crucible and boiled. After boiling, a bead mill is performed for approximately 3 hours. The phosphor is cleaned in a 10% sodium hydroxide aqueous solution, washed and dried to obtain the phosphor as the object. This is provided as Sample 1-(4). The composition of this Sample 1-(4) is $(Y_{0.7}La_{0.05}Gd_{0.05}Nd_{0.01}Yb_{0.1})VO_4$.

Next, a phosphor is produced using yttrium (Y) and lanthanum (La) as a rare earth element represented by A.

15.8 g (0.14 mols of Y element) of yttrium oxide ($Y_2O_3$) serving as a material of yttrium (Y), 3.26 g (0.02 mols of La element) of lanthanum oxide ($La_2O_3$) serving as a material of lanthanum (La), 3.37 g (0.02 mols of Nd element) of neodymium oxide ($Nd_2O_3$) serving as a material of neodymium (Nd), and 3.94 g (0.02 mols of Yb element) of ytterbium oxide ($Yb_2O_3$) serving as a material of ytterbium (Yb) are heated and dissolved in nitric acid to produce an aqueous solution. Then, an oxalic acid aqueous solution is added to this aqueous solution to precipitate an oxalic acid coprecipitate. This oxalic acid coprecipitate is fired in air at approximately 900° C. for approximately 3 hours to convert the same into a coprecipitated oxide. 1.61 g (0.005 mols of K, 2.5 mol % based on Y+La+Yb+Nd) of potassium stearate ($C_{17}H_{35}COOK$) as flux is sufficiently added with the thus obtained coprecipitated oxide in an alumina mortar using ethanol as a solvent, and dried. After drying, 25.7 g (0.22 mols of V element and 1.1 times based on Y+La+Yb+Nd) of ammonium vanadate ($NH_4VO_3$) serving as a material of vanadium (V) is further added, and sufficiently mixed to provide a mixed powder. The obtained mixed powder is fired at approximately 1150° C. for approximately 4 hours. The mixed powder is taken out from an electric furnace immediately after firing, and cooled in air.

Then, boiling water of 80° C. to 100° C. is put into a crucible. The phosphor is then taken out from the crucible and boiled. After boiling, a bead mill is performed for approximately 3 hours. The phosphor is cleaned in a 10% sodium hydroxide aqueous solution, washed and dried to obtain the phosphor as the object. This is provided as Sample 1-(5). The composition of this Sample 1-(5) is $(Y_{0.7}La_{0.1}Nd_{0.1}Yb_{0.1})VO_4$.

Next, the light emitting properties of Sample 1-(1) to Sample 1-(5) are investigated.

A fluorescence spectrophotometer (type: RE-5000, manufactured by Shimadzu Corporation) extended so as to measure light emitting properties even in an infra-red wavelength range is used. Light of 588 nm which is an orange wavelength range and light of 825 nm which is an infra-red wavelength range are selected as excitation light. Furthermore, an emission spectrum emitted when each excitation light is applied is measured in a range of 800 nm to 1100 nm. Furthermore, a height from a baseline of an emission peak near 980 nm is provided as an emission intensity by focusing attention on the emission peak near 980 nm of the range.

For comparison, as the conventional infra-red light emitting phosphor, for example, an $Nd_{0.9}Yb_{0.1}Na_5(MoO_4)_4$ phosphor described in Example 2 (page 5) of Patent Document 2 is provided as Comparative Example 1. As another Comparative Example, an $Nd_{0.1}Yb_{0.1}Gd_{0.1}Y_{0.7}PO_4$ phosphor described in Example 2 of Patent Document 4 is provided as Comparative Example 2. Furthermore, an $Nd_{0.1}Yb_{0.1}La_{0.1}Y_{0.7}PO_4$ phosphor prepared by replacing gadolinium (Gd) of Comparative Example 2 with lanthanum (La) is provided as Comparative Example 3.

The light emitting properties of the phosphors of Comparative Example 1 to Comparative Example 3 and Sample 1-(1) to Sample 1-(5) are shown in Table 1. At this time, the emission intensity is represented as the relative luminance prepared by setting the emission intensity in each excitation light of Comparative Example 1 to 100.

Figure 1:
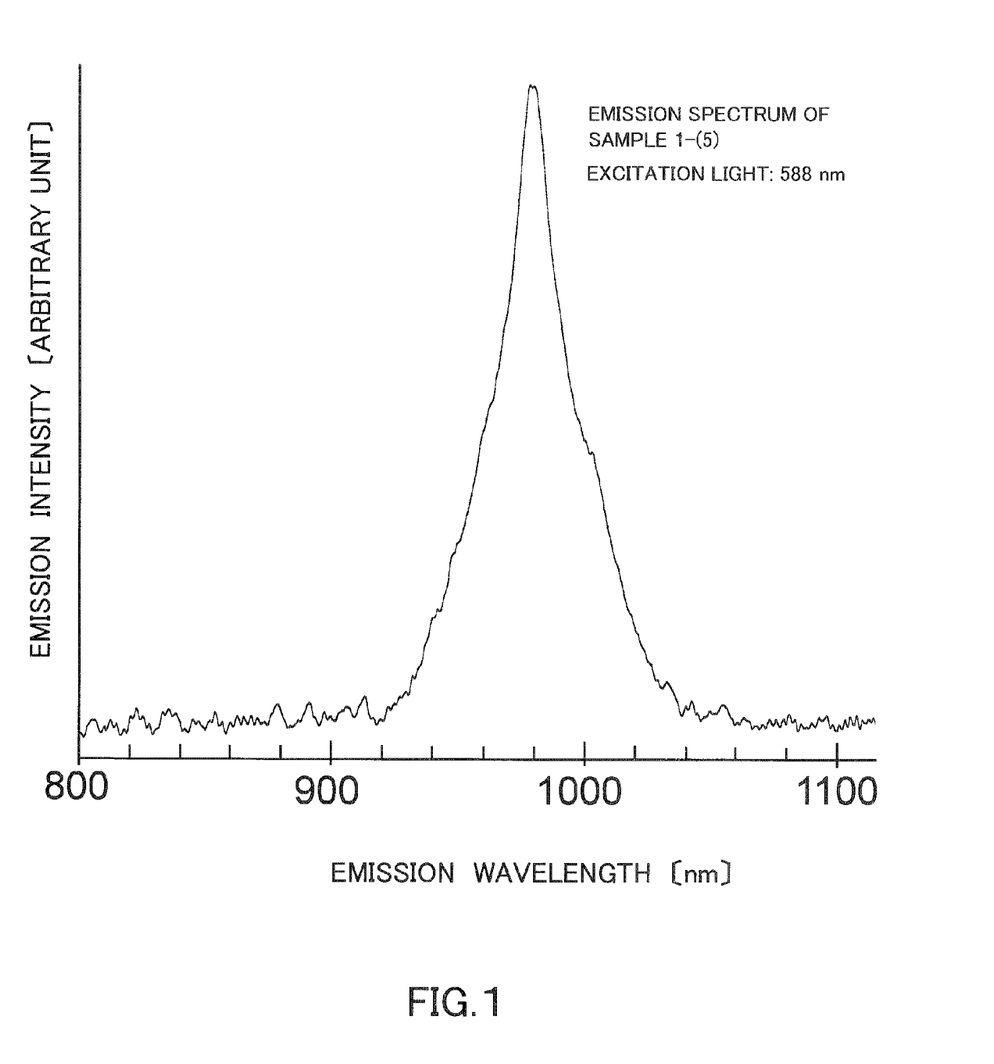
FIG. 1 is a graph showing an emission spectrum of an infra-red light emitting phosphor of an embodiment of the present invention in 588 nm excitation.
Figure 2:
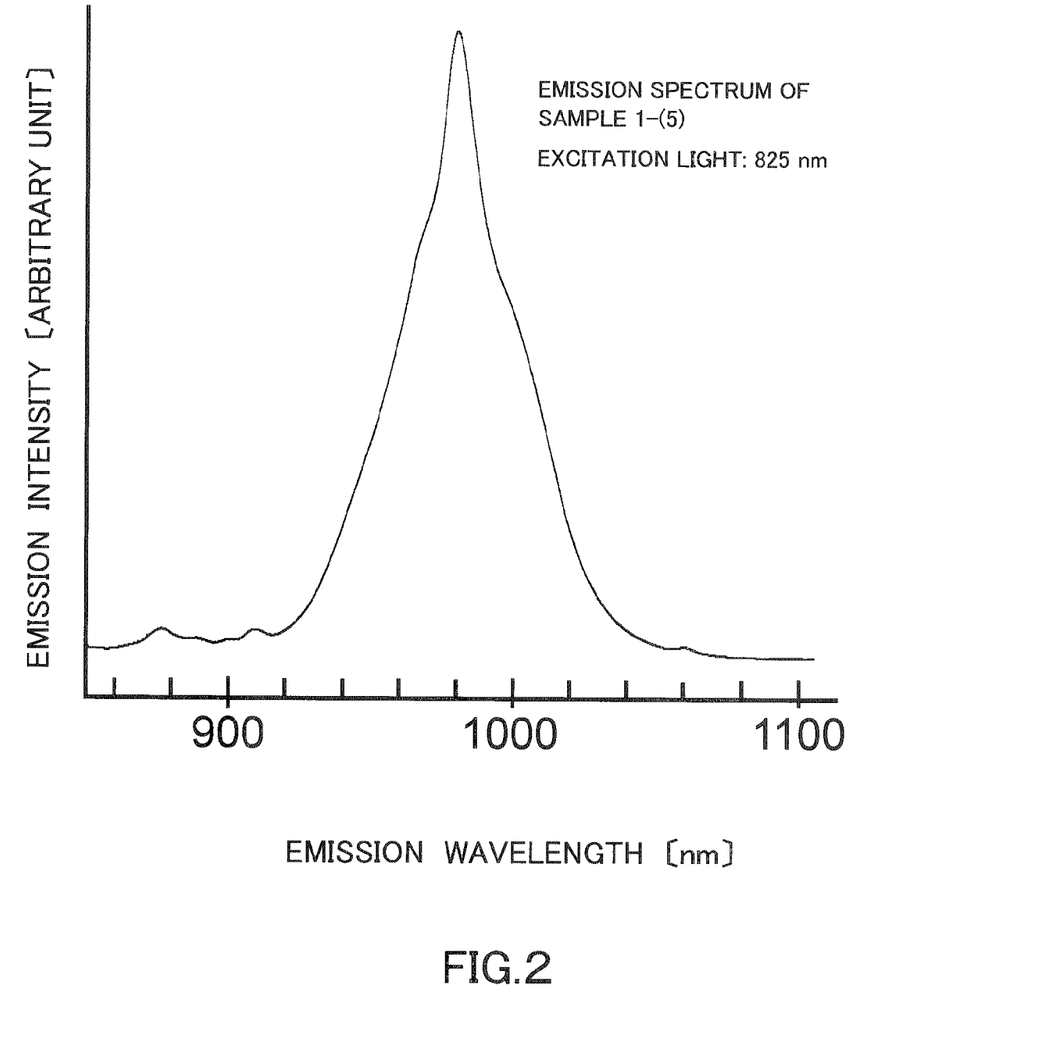
FIG. 2 is a graph showing an emission spectrum of an infra-red light emitting phosphor of an embodiment of the present invention in 825 nm excitation.
Figure 3:
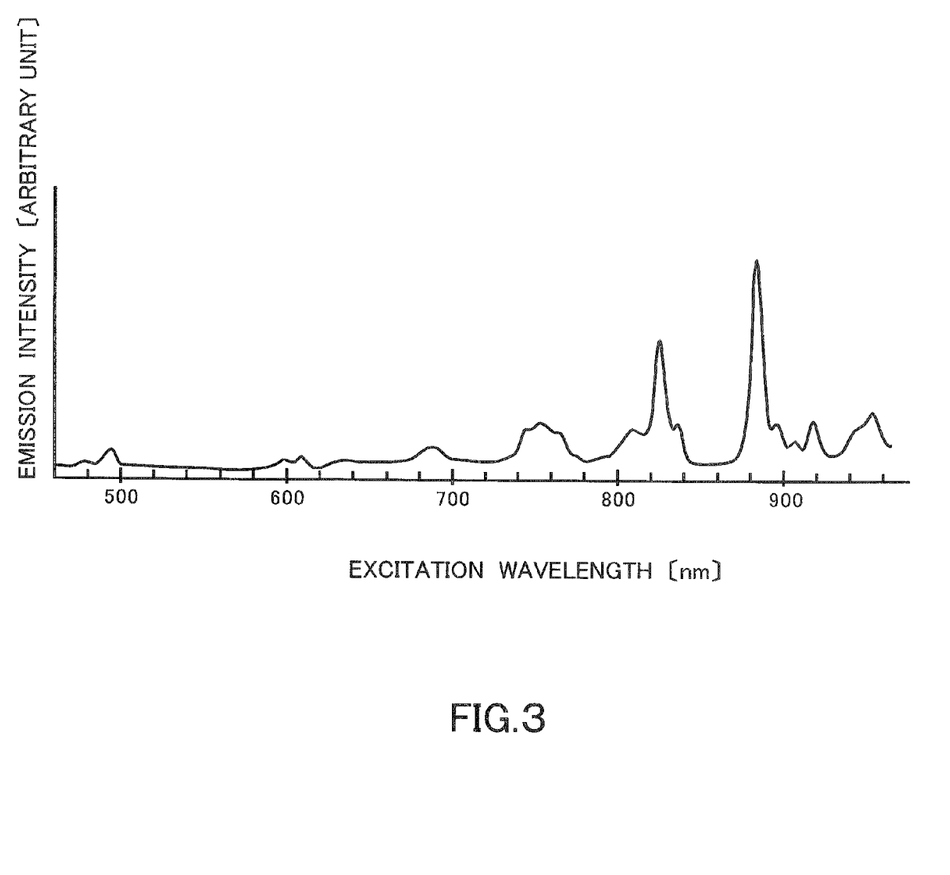
FIG. 3 is a graph showing an excitation spectrum of an infra-red light emitting phosphor of an embodiment of the present invention in 980 nm emission.
Figure 4:
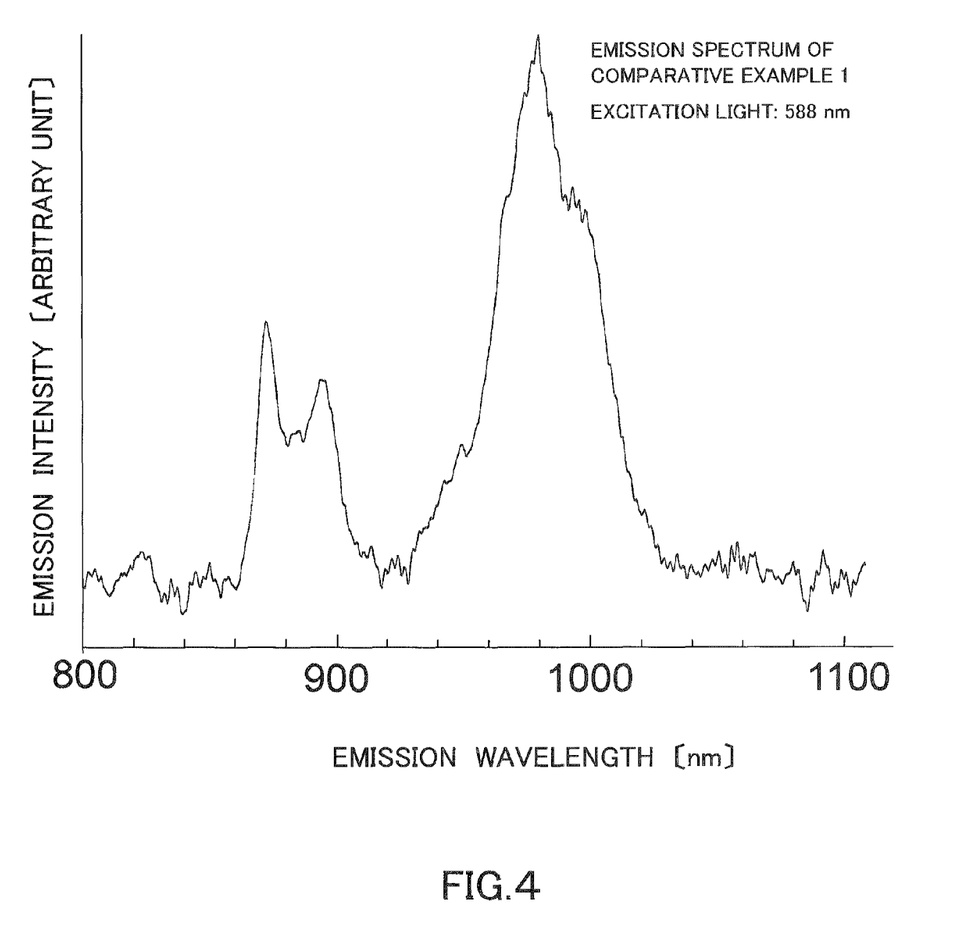
FIG. 4 is a graph showing an emission spectrum of a conventional infra-red light emitting phosphor in 588 nm excitation.

Also, emission spectrums obtained by exciting the sample 1-(5) using light of 588 nm and light of 825 nm are shown in FIGS. 1 and 2. Also, the excitation spectrum when the emission wavelength is 980 nm is shown in FIG. 3. For comparison, an emission spectrum obtained exciting Comparative Example 1 using light of 588 nm is shown in FIG. 4.

TABLE 1

| | | Emission Intensity (Relative Luminance) | |
|---|---|---|---|
| Samples | Compositions of Phosphors | In 588 nm Excitation | In 825 nm Excitation |
| Comparative Example 1 | $Nd_{0.9}Yb_{0.1}Na_5(MoO_4)_4$ | 100 | 100 |
| Comparative Example 2 | $Nd_{0.1}Yb_{0.1}Y_{0.7}Gd_{0.1}PO_4$ | 65 | 38 |
| Comparative Example 3 | $Nd_{0.1}Yb_{0.1}Y_{0.7}La_{0.1}PO_4$ | 49 | 32 |
| Sample 1-(1) | $(Y_{0.8}Nd_{0.1}Yb_{0.1})VO_4$ | 213 | 189 |
| Sample 1-(2) | $(Y_{0.7}Gd_{0.1}Nd_{0.1}Yb_{0.1})VO_4$ | 221 | 200 |
| Sample 1-(3) | $(Y_{0.7}Lu_{0.1}Nd_{0.1}Yb_{0.1})VO_4$ | 215 | 192 |
| Sample 1-(4) | $(Y_{0.7}La_{0.05}Gd_{0.05}Nd_{0.1}Yb_{0.1})VO_4$ | 232 | 217 |
| Sample 1-(5) | $(Y_{0.7}La_{0.1}Nd_{0.1}Yb_{0.1})VO_4$ | 258 | 225 |

As is apparent from the results shown in Table 1, it is understood that an infra-red light emitting phosphor represented by $(A_{1-x-y}Nd_xYb_y)VO_4$ where at least one rare earth element selected from the group consisting of yttrium (Y), gadolinium (Gd), lutetium (Lu) and lanthanum (La) is used as A and at least x and y are respectively set to 0.1 has desirable and higher emission intensity than those of Comparative Example 1 to Comparative Example 3.

Furthermore, the infra-red light emitting phosphor has higher relative luminance in the case where it is excited with light of 588 nm in the visible light range as compared to the case where it is excited with light of 825 nm in the infra-red range. It is understood that when Sample 1-(1) to Sample 1-(5) are excited at 588 nm in the visible light range, the samples have more desirable light emitting properties.

EXAMPLE 2

Next, the infra-red light emitting phosphor of the present invention in changing the amount x of neodymium (Nd) and the amount y of ytterbium (Yb) will be described using a sample in which yttrium (Y) and lanthanum (La) are used as a rare earth element represented by A as an example.

A phosphor is produced in the same manner as in the manufacturing method of Sample 1-(5) of Example 1 except that the amounts of neodymium (Nd), ytterbium (Yb), yttrium (Y) and lanthanum (La) are changed to the molar ratios shown in Table 2. These are provided as Sample 2-(1) to Sample 2-(21).

The thus obtained light emitting properties of Sample 2-(1) to Sample 2-(21) are investigated in the same manner as in Example 1, and the results are shown in Table 2 with the result of Comparative Example 1.

However, it is understood that Sample 2-(1) in which each of the amount x of neodymium and amount y of ytterbium is 0.001 (less than 0.01) has remarkably lower emission intensity than that of Comparative Example 1. This is considered to be because the concentration as the activator is insufficient. Furthermore, it is understood that Sample 2-(16) and Sample 2-(20) in which the amounts x of neodymium are respectively 0.37 and 0.4 (exceed 0.3) have lower emission intensities than that of Comparative Example 1. It is understood that Sample 2-(17) in which the amount y of ytterbium is 0.42 (exceeds

TABLE 2

| Sample | 1 − x − y<br>Y | <br>La | x<br>Nd | y<br>Yb | x + y<br>Nd + Yb | y/x<br>Yb/Nd | Emission Intensity (Relative Luminance) | |
|---|---|---|---|---|---|---|---|---|
| | | | | | | | In 588 nm excitation | In 825 nm excitation |
| Comparative Example 1 | | | | | | | 100 | 100 |
| Sample 2-(1) | 0.899 | 0.099 | 0.001 | 0.001 | 0.002 | 1 | 8 | 5 |
| Sample 2-(2) | 0.88 | 0.1 | 0.01 | 0.01 | 0.02 | 1 | 235 | 182 |
| Sample 2-(3) | 0.83 | 0.1 | 0.02 | 0.05 | 0.07 | 2.5 | 278 | 213 |
| Sample 2-(4) | 0.72 | 0.1 | 0.06 | 0.11 | 0.17 | 1.833 | 228 | 243 |
| Sample 2-(5) | 0.75 | 0.1 | 0.1 | 0.05 | 0.15 | 0.5 | 238 | 230 |
| Sample 1-(5) | 0.7 | 0.1 | 0.1 | 0.1 | 0.2 | 1 | 258 | 225 |
| Sample 2-(6) | 0.7 | 0.1 | 0.15 | 0.05 | 0.2 | 0.333 | 164 | 167 |
| Sample 2-(7) | 0.64 | 0.1 | 0.06 | 0.2 | 0.26 | 3.333 | 168 | 120 |
| Sample 2-(8) | 0.62 | 0.1 | 0.25 | 0.03 | 0.28 | 0.12 | 78 | 67 |
| Sample 2-(9) | 0.6 | 0.1 | 0.15 | 0.15 | 0.3 | 1 | 289 | 261 |
| Sample 2-(10) | 0.6 | 0.1 | 0.2 | 0.1 | 0.3 | 0.5 | 233 | 213 |
| Sample 2-(11) | 0.5 | 0.1 | 0.12 | 0.28 | 0.3 | 2.333 | 152 | 118 |
| Sample 2-(12) | 0.59 | 0.1 | 0.01 | 0.3 | 0.31 | 30 | 73 | 75 |
| Sample 2-(13) | 0.55 | 0.1 | 0.05 | 0.3 | 0.35 | 6 | 155 | 148 |
| Sample 2-(14) | 0.54 | 0.1 | 0.3 | 0.06 | 0.36 | 0.2 | 113 | 108 |
| Sample 2-(15) | 0.5 | 0.1 | 0.2 | 0.2 | 0.4 | 1 | 148 | 154 |
| Sample 2-(16) | 0.44 | 0.06 | 0.37 | 0.13 | 0.5 | 0.351 | 35 | 43 |
| Sample 2-(17) | 0.41 | 0.1 | 0.07 | 0.42 | 0.49 | 6 | 88 | 91 |
| Sample 2-(18) | 0.4 | 0.1 | 0.1 | 0.4 | 0.5 | 4 | 106 | 113 |
| Sample 2-(19) | 0.4 | 0.1 | 0.3 | 0.2 | 0.5 | 0.667 | 105 | 114 |
| Sample 2-(20) | 0.4 | 0.1 | 0.4 | 0.1 | 0.5 | 0.25 | 81 | 79 |
| Sample 2-(21) | 0.35 | 0.1 | 0.25 | 0.3 | 0.55 | 1.2 | 24 | 23 |

The results of Table 2 show that 14 samples of Sample 2-(2) to Sample 2-(7), Sample 2-(9) to Sample 2-(11), Sample 2-(13) to Sample 2-(15) and Sample 2-(18) and Sample 2-(19) have emission intensities exceeding that of Comparative Example in any of the excitation lights. It is understood that the amount x of neodymium (Nd) and the amount y of ytterbium (Yb) in these samples satisfy all the ranges represented by the following formulae.

$0.01 \leq x \leq 0.3$, $0.0 \leq y \leq 0.4$, $(x+y) \leq 0.5$, and $0.2 \leq (y/x) \leq 6$.

Furthermore, it is understood that 7 samples of Sample 2-(2) to Sample 2-(5), Sample 1-(5), Sample 2-(9) and Sample 2-(10) show more desirable emission intensities two times or more as that of Comparative Example 1. It is understood that the amount x of neodymium (Nd) and the amount y of ytterbium (Yb) of these desirable samples satisfy all the ranges represented by the following formulae.

$0.01 \leq x \leq 0.2$, $0.01 \leq y \leq 0.15$, $(x+y) \leq 0.3$, and $0.5 \leq (y/x) \leq 2.5$.

0.4) has lower emission intensity than that of Comparative Example 1. Each of them is considered to be a reduction in the emission intensity due to concentration quenching.

These show that the emission intensity is unpreferably reduced when the amount x of neodymium exceeds the range of $0.01 \leq x \leq 0.3$ and the emission intensity is unpreferably reduced when the amount y of ytterbium exceeds the range of $0.01 \leq y \leq 0.4$.

Also, it is understood that Sample 2-(21) in which x+y representing the total of amounts of neodymium and ytterbium is 0.55 (exceeds 0.5) has significantly lower emission intensity than that of Comparative Example 1. This is considered to be because the concentration of the activator to the host is excessively increased.

Furthermore, it is understood that the Sample 2-(8) in which y/x representing the molar ratio of ytterbium to neodymium is 0.12 (less than 0.2) has lower emission intensity than that of Comparative Example 1. Similarly, it is understood that Sample 2-(12) in which y/x is 30 (exceeds 6) has lower emission intensity than that of Comparative Example 1. Each of them is considered to be because the balance of the amount of ytterbium to the amount of neodymium is poor and the energy transfer efficiency to ytterbium from neodymium is reduced.

They show that the emission intensity is unpreferably reduced when x+y representing the total of the amounts of neodymium and ytterbium exceeds the range of $(x+y) \leq 0.5$. Also, they show that the emission intensity is unpreferably reduced when y/x representing the molar ratio of ytterbium to neodymium exceeds the range of $0.2 \leq (y/x) \leq 6$.

As described above, it is understood that an excellent infrared light emitting phosphor having higher emission intensity than those of Comparative Examples 1 to 3 is obtained by setting the amount x of neodymium to $0.01 \leqq x \leqq 0.3$, setting the amount y of ytterbium to $0.01 \leqq y \leqq 0.4$, setting x+y representing the total amount of neodymium and ytterbium to 0.5 or less and setting y/x representing the molar ratio of ytterbium to neodymium to $0.2 \leqq (y/x) \leqq 6$.

The rare earth element represented by A is confirmed even in the case of a combination other than the above yttrium and lanthanum. However, it is confirmed that the relationship between the amount x of neodymium, amount y of ytterbium and light emitting properties has the same tendency.

EXAMPLE 3

Next, the chemical resistance of the infra-red light emitting phosphor of the present invention will be described.

In order to confirm the chemical resistance using Sample 1-(5) in the above Example 1 and Sample 2-(9) in the above Example 2 as an example, first, the change of the light emitting properties of the samples when the samples are immersed in an acid aqueous solution is investigated.

First, 10 g of each of Sample 1-(5), Sample 2-(9) and Comparative Example 1 for comparison is taken, and is immersed in a 2% sulfuric acid aqueous solution of 200 ml. Furthermore, each of the samples is stirred by a stirrer for 2 hours. Then, each sample is taken out, washed and dried to obtain a sample for acid resistance evaluation.

This sample for acid resistance evaluation is measured using the fluorescence spectrophotometer in the same manner as in Example 1. Light of 588 nm which is in an orange wavelength range and light of 825 nm which is in an infra-red wavelength range are selected as the excitation light. Furthermore, a height from a baseline of an emission peak near 980 nm is provided as an emission intensity using the emission spectrum when each excitation light is applied. The emission intensity is shown in Table 3 as the relative luminance in which the emission intensity of Comparative Example 1 before immersion is set to 100. The change rate of the emission intensity from before immersion is simultaneously shown in Table 3 as the luminance maintenance rate.

TABLE 3

| | Chemical Resistance Test: Stirring in 2%-$H_2SO_4$ for 2 hours | | | | | |
|---|---|---|---|---|---|---|
| | In 588 nm Excitation | | | In 825 nm Excitation | | |
| | Emission Intensity (Relative Luminance) | | Luminance | Emission Intensity (Relative Luminance) | | Luminance |
| Samples | Before Immersion | After 2 hours | Maintenance Rate | Before Immersion | After 2 hours | Maintenance Rate |
| Comparative Example 1 | 100 | 27 | 27% | 100 | 28 | 28% |
| Sample 1-(5) | 258 | 238 | 92% | 225 | 216 | 96% |
| Sample 2-(9) | 289 | 263 | 91% | 261 | 260 | 100% |

These results of Table 3 show that the luminance maintenance rate of Comparative Example 1 is 27% in 588 nm excitation and 28% in 825 nm excitation, and the respective emission intensities are significantly reduced by degradation. However, it is understood that since the luminance maintenance rates of Sample 1-(5) and Sample 2-(9) are 92% and 91% in 588 nm excitation, and 96% and 100% in 825 nm excitation, the emission intensity is substantially maintained.

As samples other than Sample 1-(5) and Sample 2-(9), Sample 1-(1) to Sample 1-(4) are also confirmed, and the same results are obtained.

Furthermore, the change of the light emitting properties is investigated in immersing the samples in an alkaline aqueous solution as in the case of the acid resistance. The samples are immersed in the alkaline aqueous solution in the same manner as in the above acid resistance evaluation except that a 1% sodium hydroxide aqueous solution is used as the alkaline aqueous solution, and the obtained samples for alkali resistance evaluation are measured in the same manner. The results are shown in Table 4.

TABLE 4

| | Chemical Resistance Test: Stirring in 1%-NaOH for 2 hours | | | | | |
| --- | --- | --- | --- | --- | --- | --- |
| | In 588 nm Excitation | | | In 825 nm Excitation | | |
| | Emission Intensity (Relative Luminance) | | Luminance | Emission Intensity (Relative Luminance) | | Luminance |
| Samples | Before Immersion | After 2 hours | Maintenance Rate | Before Immersion | After 2 hours | Maintenance Rate |
| Comparative Example 1 | 100 | 79 | 79% | 100 | 76 | 76% |
| Sample 1-(5) | 258 | 236 | 91% | 225 | 206 | 92% |
| Sample 2-(9) | 289 | 237 | 82% | 261 | 242 | 93% |

The results of Table 4 show that the luminance maintenance rate of Comparative Example 1 is 79% in 588 nm excitation and 76% in 825 nm excitation, and the respective emission intensities are reduced by degradation. However, the luminance maintenance rates of Sample 1-(5) and Sample 2-(9) are 91% and 82% in 588 nm excitation, and 92% and 93% in 825 nm excitation. It is understood that the samples have a higher luminance maintenance rate than that of Comparative Example 1.

When Sample 1-(1) to Sample 1-(4) are also confirmed as samples other than Sample 1-(5) and Sample 2-(9), the same results are obtained.

The above description shows that the infra-red light emitting phosphor whose host is a vanadate has characteristics more excellent in chemical resistance to the acid aqueous solution and alkaline aqueous solution or the like as compared to that of the conventional infra-red light emitting phosphor whose part of composition elements of the host is an alkaline metal and which is chemically unstable.

Even when this infra-red light emitting phosphor further contains, for example, europium (Eu), terbium (Tb), samarium (Sm), erbium (Er), thulium (Tm), dysprosium (Dy), holmium (Ho), cerium (Ce) or praseodymium (Pr) as the rare earth elements other than yttrium (Y), gadolinium (Gd), lutetium (Lu), lanthanum (La), neodymium (Nd) or ytterbium (Yb), it is confirmed that the infra-red light emitting phosphor has the same characteristics.

Also, when this infra-red light emitting phosphor contains phosphorus (P), or even when a part of vanadium (V) is replaced with phosphorus (P), it is also confirmed that the infra-red light emitting phosphor has the same characteristics.

Furthermore, even when this infra-red light emitting phosphor contains silicon (Si) and germanium (Ge) of a small amount of approximately hundreds of ppm, it is also confirmed that the infra-red light emitting phosphor has the same characteristics.

INDUSTRIAL APPLICABILITY

The infra-red light emitting phosphor of the present invention can be suitably used for the formation of the latent image mark for preventing forgery. Since the infra-red light emitting phosphor has excellent chemical resistance, in particular, and can be suitably used as an aqueous ink or the like, the infra-red light emitting phosphor can be suitably used for mark formation due to printing, in particular. The infra-red light emitting phosphor provided on textiles or the like can also be suitably used as a fabric label for preventing forgery.

The invention claimed is:

1. A powdered infra-red light emitting phosphor represented by a chemical formula: $(A_{1-x-y}Nd_xYb_y)VO_4$, wherein
   A represents at least one element selected from yttrium (Y), gadolinium (Gd), lutetium (Lu) and lanthanum (La);
   x and y respectively satisfy the requirements: $0.01 \leq x \leq 0.3$ and $0.01 \leq y \leq 0.4$, provided that $(x+y) \leq 0.5$ and $0.2 \leq (y/x) \leq 6$.

2. The infra-red light emitting phosphor according to claim 1, wherein x and y respectively satisfy the requirements: $0.01 \leq x \leq 0.2$ and $0.01 \leq y \leq 0.15$, provided that $(x+y) \leq 0.3$ and $0.5 \leq (y/x) \leq 2.5$.

* * * * *